United States Patent
Araki et al.

(10) Patent No.: US 11,077,852 B2
(45) Date of Patent: Aug. 3, 2021

(54) SHIFT CONTROL DEVICE AND SHIFT CONTROL METHOD FOR VEHICLE

(71) Applicants: JATCO Ltd, Fuji (JP); NISSAN MOTOR CO., LTD., Yokohama (JP)

(72) Inventors: Toshimitsu Araki, Ebina (JP); Tomoaki Honma, Isehara (JP); Yasuhiro Endo, Isehara (JP); Hiroshi Kuroiwa, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 9 days.

(21) Appl. No.: 16/485,760

(22) PCT Filed: Jan. 26, 2018

(86) PCT No.: PCT/JP2018/002375
§ 371 (c)(1),
(2) Date: Aug. 13, 2019

(87) PCT Pub. No.: WO2018/155067
PCT Pub. Date: Aug. 30, 2018

(65) Prior Publication Data
US 2020/0023849 A1    Jan. 23, 2020

(30) Foreign Application Priority Data
Feb. 21, 2017 (JP) .............................. JP2017-029741

(51) Int. Cl.
*B60W 30/18* (2012.01)
*B60W 10/06* (2006.01)
(Continued)

(52) U.S. Cl.
CPC ...... *B60W 30/18072* (2013.01); *B60W 10/06* (2013.01); *B60W 10/107* (2013.01);
(Continued)

(58) Field of Classification Search
CPC .............. B60W 10/06; B60W 10/107; B60W 2510/0638; B60W 2540/10;
(Continued)

(56) References Cited

U.S. PATENT DOCUMENTS 9,944,286 B2 *  4/2018  Kamiya ................ B60W 10/06
9,969,397 B2 *  5/2018  Yokokawa .......... B60W 10/023
(Continued)

FOREIGN PATENT DOCUMENTS

JP    2011127696 A  *  6/2011
JP    2011-185377 A    9/2011

*Primary Examiner* — David R Morris
(74) *Attorney, Agent, or Firm* — Foley & Lardner LLP

(57) ABSTRACT

A shift control device for a vehicle includes: an engine; a shift mechanism disposed between the engine and driving wheels; a shift control section configured to control a transmission gear ratio of the shift mechanism; and a fuel cut control section configured to stop a fuel supply to the engine, at least when an accelerator pedal is in a release state, and when an engine speed is equal to or greater than a predetermined rotation speed, the shift control section being configured to perform a minimum rotation speed restriction control to control the transmission gear ratio of the shift mechanism so that the minimum rotation speed of the engine is equal to or greater than the predetermined rotation speed regardless of a vehicle front condition and an accelerator operation condition.

6 Claims, 6 Drawing Sheets

(51) Int. Cl.
*B60W 10/107* (2012.01)
*F16H 59/22* (2006.01)
*F16H 59/36* (2006.01)
*F16H 59/74* (2006.01)
*F16H 59/78* (2006.01)
*B60W 30/188* (2012.01)
*F16H 61/66* (2006.01)
*F16H 61/662* (2006.01)

(52) U.S. Cl.
CPC ............. *F16H 59/22* (2013.01); *F16H 59/36* (2013.01); *F16H 59/74* (2013.01); *F16H 59/78* (2013.01); *B60W 30/1884* (2013.01); *B60W 2510/0647* (2013.01); *B60W 2510/0676* (2013.01); *B60W 2540/10* (2013.01); *B60W 2710/06* (2013.01); *B60W 2710/0655* (2013.01); *B60W 2710/1005* (2013.01); *B60W 2720/00* (2013.01); *F16H 61/66* (2013.01); *F16H 61/662* (2013.01); *F16H 2059/366* (2013.01); *F16H 2059/746* (2013.01)

(58) Field of Classification Search
CPC ..... B60W 2710/1005; B60W 2710/06; B60W 30/18072; B60W 30/1884
See application file for complete search history.

(56) References Cited

U.S. PATENT DOCUMENTS

2017/0028990 A1\* 2/2017 Yokokawa ............ B60W 10/06
2017/0151952 A1\* 6/2017 Kamiya .............. B60W 10/026

\* cited by examiner

SHIFT CONTROL DEVICE AND SHIFT CONTROL METHOD FOR VEHICLE

TECHNICAL FIELD

This invention relates to a shift control device for a vehicle including an engine, the shift control device configured to perform a fuel cut control by using an accelerator operation condition and an engine speed condition.

BACKGROUND ART

Conventionally, in a case where a release of an accelerator pedal is presumed in accordance with a traveling condition of a preceding vehicle ahead of own vehicle, a transmission gear ratio of an automatic transmission is controlled so that an engine speed becomes equal to or greater than a predetermined rotation speed before the accelerator pedal is released. With this, it is possible to perform a fuel cut control when the accelerator pedal is released, and to improve a fuel economy. Besides, the release of the accelerator pedal is presumed based on a descending road ahead of the vehicle, and decrease of an intervehicle distance between the own vehicle and the preceding vehicle (cf. for example, patent document 1).

However, in the above-described conventional art, the release of the accelerator pedal is often not presumed before the release operation, though the accelerator pedal is released during the traveling. Accordingly, there is a room for improving the fuel economy.

That is, in the case where there is the corner or the descending road ahead of the vehicle like the conventional art, and in the case where the intervehicle distance is decreased, the driver releases the accelerator pedal for the deceleration. However, even in the case where there is no corner and no descending road ahead of the vehicle, or even in the case where the intervehicle distance is not decreased, the driver releases the accelerator pedal. For example, the accelerator pedal is released for adjusting the vehicle speed for the traveling at the constant speed. The accelerator pedal is released by judging that the acceleration is not needed. In these traveling scenes, in the conventional art, the release of the accelerator pedal is not presumed. The engine speed does not become equal to or greater than the predetermined rotation speed before the release of the accelerator pedal. Accordingly, the engine speed condition is not satisfied even when the accelerator pedal is released. Consequently, the fuel cut control is not performed, so that it is not possible to improve the fuel economy.

PRIOR ART DOCUMENT

Patent Document

Japanese Patent Application Publication No. 2011-185377

SUMMARY OF THE INVENTION

It is, therefore, an object of the present invention to provide a shift control device for a vehicle which is devised to solve the above-described problems, and to enlarge a traveling scene in which a fuel cut for an improvement of a fuel economy is performed, when an accelerator pedal is released during a traveling.

For attaining the above-described objects, the shift control device for a vehicle according to the present invention includes an engine, a shift mechanism disposed between the engine and driving wheels, a shift control means configured to control a transmission gear ratio of the shift mechanism; and a fuel cut control means.

The fuel cut control means is configured to stop a fuel supply to the engine, at least when an accelerator pedal is in a release state, and when an engine speed is equal to or greater than a predetermined rotation speed.

The shift control means is configured to perform a minimum rotation speed restriction control to control the transmission gear ratio of the shift mechanism so that the minimum rotation speed of the engine is equal to or greater than the predetermined rotation speed regardless of a vehicle front condition and an accelerator operation condition.

In this way, the minimum rotation speed of the engine is increased, regardless of the vehicle front condition and the accelerator operation condition. With this, it is possible to enlarge the traveling scene in which the fuel cut control for improving the fuel economy is performed, when the accelerator pedal is released during the traveling.

DESCRIPTION OF EMBODIMENTS

Hereinafter, a shift control device according to one embodiment of the present invention is explained with reference to the drawings.

First Embodiment

Firstly, a configuration is explained.

A shift control device according to the first embodiment is applied to an engine vehicle including a driving system including an engine in which a fuel cut control is performed when an accelerator release condition and an engine speed condition are satisfied, and a belt type continuously variable transmission (a torque converter+a variator). Hereinafter, the configuration in the first embodiment is explained with reference to "Overall System Configuration", "Normal Shift Control Configuration and Lockup Control Configuration", "Fuel Cut Control Process Configuration", and "Shift Control Process Configuration"

[Overall System Configuration]

Figure 1:
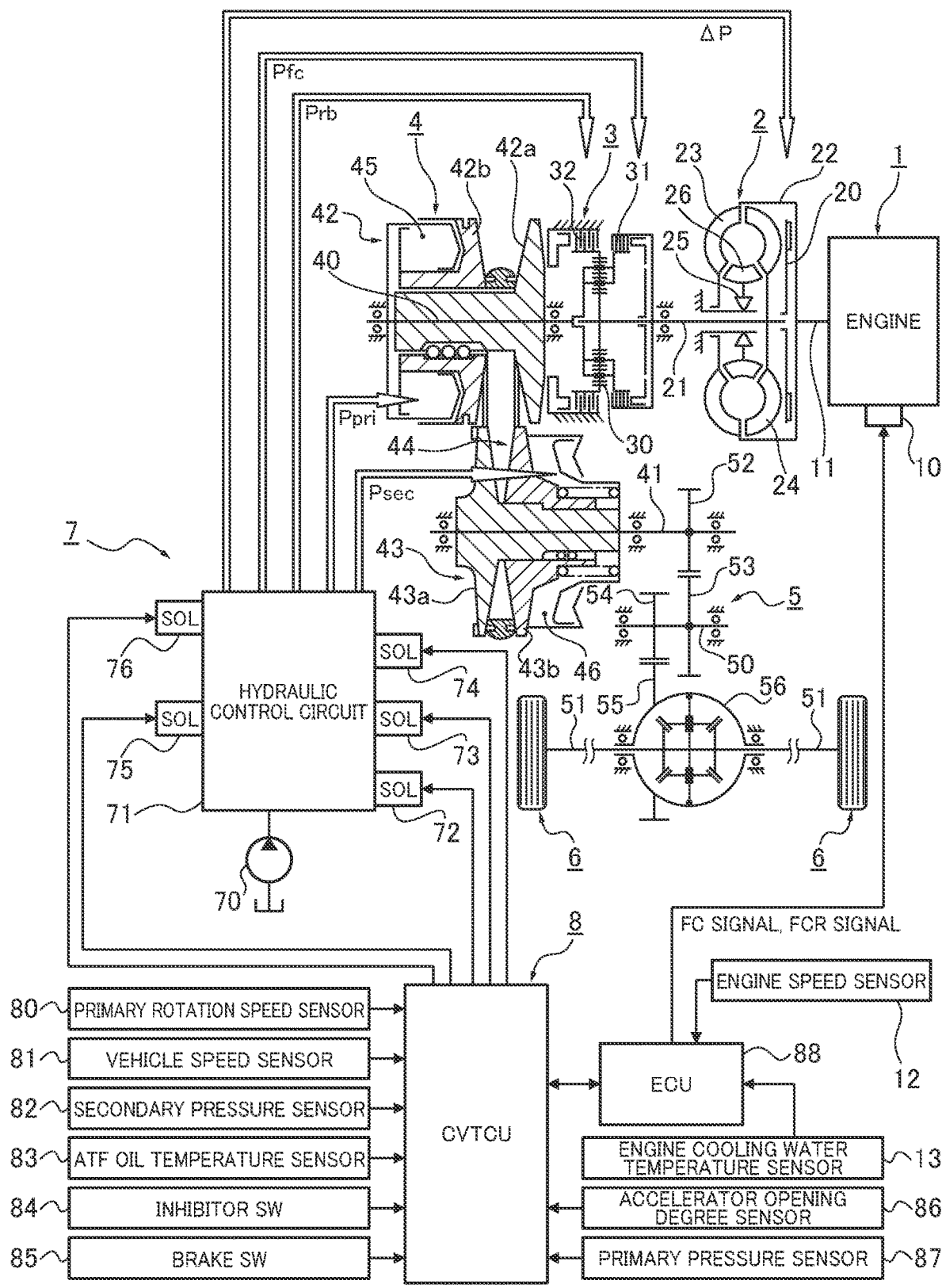
FIG. 1 is an overall system view showing a driving system and a control system of an engine vehicle including a belt type continuously variable transmission to which a shift control device according to a first embodiment is applied.

FIG. 1 shows a driving system and a control system of an engine vehicle to which the shift control device according to the first embodiment is applied. Hereinafter, the overall system configuration is explained with reference to FIG. 1.

The driving system of the engine vehicle includes an engine 1; a torque converter 2, a forward and rearward switching mechanism 3; a variator 4 (shift mechanism), and a final speed reduction mechanism 5; and driving wheels 6 and 6, as shown in FIG. 1.

The engine 1 is a driving source for the traveling. In the engine 1, an idling control and an engine output control are performed in accordance with an accelerator operation amount by a driver. In addition to this engine output control, a fuel cut control is performed to stop a fuel supply to the engine 1 when a fuel cut signal is inputted at the accelerator release operation. Accordingly, the engine 1 includes a fuel injection actuator 10 arranged to shut off a fuel injection when a fuel cut signal (FC signal) is inputted, and to reinject the fuel when a fuel cut recovery signal (FCR signal) is inputted.

The torque converter 2 is a start element having a torque increasing function. The torque converter 2 includes a lockup clutch 20 arranged to be engaged when the torque increasing function is not needed. This torque converter 2 includes, constituting elements, a pump impeller 23 connected through a converter housing 22 to an engine output shaft 11; a turbine runner 24 connected to a torque converter output shaft 21; and a stator 26 provided through one-way clutch 25 to a case.

The lockup clutch 20 is arranged to transmit the torque between the engine output shaft 11 and the torque converter output shaft 21 through the torque converter 2 in a clutch disengagement state, and to directly connect the engine output shaft 11 and the torque converter output shaft 21 in a clutch full engagement state. Accordingly, in the clutch full engagement state, the engine speed corresponds to the turbine rotation speed.

The forward and rearward switching mechanism 3 is a mechanism arranged to switch an input rotation direction to the variator between a normal rotation direction at the forward traveling, and a reverse rotation direction at the rearward traveling. This forward and rearward switching mechanism 3 includes a double pinion type planetary gear 30; a forward clutch 31 constituted by a wet type multiple plate clutch; and a rearward brake 32 constituted by a wet type multiple plate brake.

The forward clutch 31 is arranged to be engaged by a forward clutch pressure Pfc at a selection of a forward traveling range such as a D range. The rearward brake 32 is arranged to be engaged by a rearward brake pressure Prb at a selection of a rearward traveling range such as an R range. Besides, the forward clutch 31 and the rearward brake 32 are arranged to be disengaged at a selection of an N range.

The variator 4 is a belt type continuously variable transmission mechanism arranged to continuously vary a transmission gear ratio (=a ratio between the variator input rotation speed and the variator output rotation speed) by variations of belt contact radii. The variator 4 includes a primary pulley 42; a secondary pulley 43; and a pulley belt 44.

The primary pulley 42 includes a fixed pulley 42a and a sliding pulley 42b which are coaxially disposed on a variator input shaft 40 connected to a carrier of the double pinion type planetary gear 30. The sliding pulley 42b is arranged to be slid by a primary pressure Ppri introduced into a primary pressure chamber 45.

The secondary pulley 43 includes a fixed pulley 43a and a sliding pulley 43b which are coaxially disposed on a variator output shaft 41 connected to the final speed reduction mechanism 5. The sliding pulley 43b is arranged to be slid by a secondary pressure Psec introduced into a secondary pressure chamber 46.

The pulley belt 44 is would between a V-shaped sheave surface of the primary pulley 42 and a V-shaped sheave surface of the secondary pulley 43. This pulley belt 44 is constituted by a pair of stacked rings formed by stacking a plurality of annular rings from inside to outside, and a plurality of elements which are made of stamping plates, and which are mounted to be stacked in an annular shape by being switched by the pair of the stacked rings. Besides, the pulley belt 44 may be a chain type belt formed by connecting a plurality of chain elements arranged in the pulley motion direction, by pins penetrating in the pulley axis direction.

The final speed reduction mechanism 5 is a mechanism which has a speed reduction function to decrease the speed of the rotation speed from the variator output shaft 41, and a differential function, and which is arranged to transmit the rotation driving force from the variator 4 to the left and right driving wheels 6 and 6. This final speed reduction mechanism 5 includes, the speed reduction mechanism, a first gear 52 provided on the variator output shaft 41; a second gear 53 and a third gear 54 provided on an idler shaft 50; and a fourth gear provided at an outer circumference positon of a differential case. Moreover, the final speed reduction mechanism 5 includes, the differential gear mechanism, a differential gear 56 disposed between left and right drive shafts 51 and 51.

As shown in FIG. 1, the control system of the engine vehicle includes a hydraulic control unit 7 which is a hydraulic control system; and a CVT control unit 8 which is an electric control system.

The hydraulic control unit 7 is a unit arranged to control control pressures necessary for the torque converter 2, the forward and rearward switching mechanism 3, and the variator 4. This hydraulic control unit 7 includes an oil pump 70 arranged to be driven and rotated by the engine 1 which is the driving source for the traveling; and a hydraulic control circuit 71 configured to control various control pressures based on the discharge pressure from the oil pump 70.

The hydraulic control circuit 71 includes a line pressure solenoid valve 72; a primary pressure solenoid valve 73; a secondary pressure solenoid valve 74; a frictional engagement element pressure solenoid valve 75; a lockup pressure difference solenoid valve 76, and so on. Besides, the pressures of the solenoid valves 72, 73, 74, 75, and 76 are controlled to command pressures by command values outputted from the CVT control unit 8 by a pulse width modulation control.

The line pressure solenoid valve 72 is arranged to control the discharge pressure from the oil pump 70 to a commanded line pressure PL in accordance with a line pressure command value outputted from the CVT control unit 8. This line pressure PL is a source pressure when the various control pressures are controlled. The line pressure PL is a hydraulic pressure for suppressing a belt slippage and a clutch slippage with respect to the torque transmitted in the driving system.

The primary pressure solenoid valve 73 is arranged to control and decrease the primary pressure Ppri introduced into the primary pressure chamber 45 based on the line pressure PL in accordance with the primary pressure command value outputted from the CVT control unit 8. The secondary pressure solenoid valve 74 is arranged to control and decrease the secondary pressure Psec introduced into the secondary pressure chamber 46 based on the line pressure PL in accordance with the secondary pressure command value outputted from the CVT control unit 8.

At the forward traveling range, the frictional engagement element pressure solenoid valve 75 is arranged to control and decrease the forward clutch pressure Pfc to the forward clutch 31 based on the line pressure PL in accordance with the forward clutch pressure command value outputted from the CVT control unit 8. At the rearward traveling range, the frictional engagement element pressure solenoid valve 75 is arranged to control and decrease the rearward clutch pressure Prb to the rearward brake 32 based on the line pressure PL in accordance with the rearward clutch pressure command value outputted from the CVT control unit 8.

The lockup pressure difference solenoid valve 76 is arranged to control a lockup pressure difference ΔP which is a pressure difference acted to an engagement hydraulic chamber and a disengagement hydraulic chamber of the lockup clutch 20, in accordance with the lockup pressure difference command value from the CVT control unit 8.

The CVT control unit 8 is configured to perform the line pressure control, the shift control, the forward and rearward switching control, the lockup control, and so on. In the line pressure control, the CVT control unit 8 is configured to output a command value to attain a target line pressure according to the accelerator opening degree and so on, to the line pressure solenoid valve 72. In the shift control, the CVT control unit 8 is configured to calculate the target primary solenoid rotation speed Npri* or the target transmission gear ratio of the variator 4, and to output a command value to attain the calculated target value, to the primary pressure solenoid valve 73 and the secondary pressure solenoid valve 74. In the forward and rearward control, the CVT control unit 8 is configured to output a command value to control the engagement/disengagement of the forward clutch 31 and the rearward brake 32 in accordance with the selected range position, to the frictional engagement element pressure solenoid valve 75.

In the lockup control, the CVT control unit 8 is configured to determine the lockup state of one of the full engagement/the slip engagement/the disengagement of the lockup clutch 20, and to output a command value to attain the determined lockup state, to the lockup pressure difference solenoid valve 76.

The CVT control unit 8 receives sensor information and switch information from a primary rotation speed sensor 80, a vehicle speed sensor 81, a secondary pressure sensor 82, an ATF oil temperature sensor 83, an inhibitor switch 84, a brake switch 85, an accelerator opening degree sensor 86, a primary pressure sensor 87, and so on. Moreover, an engine control unit 88 receives sensor information from an engine speed sensor 12, an engine cooling water temperature sensor 13, and so on.

The CVT control unit 8 receives the engine rotation speed information and the engine cooling water temperature information from the engine control unit 88 during the shift control. The primary rotation speed information from the primary rotation speed sensor 80 corresponds to the turbine rotation speed of the torque converter 2 during the traveling at the D range at which the forward clutch 31 is engaged. The inhibitor switch 84 is arranged to sense the selected range position (the D range, the N range, the R range, the P range, and so on), and to output the range position signal according to the range position.

[Normal Shift Control Configuration and Lockup Control Configuration]

Figure 2:
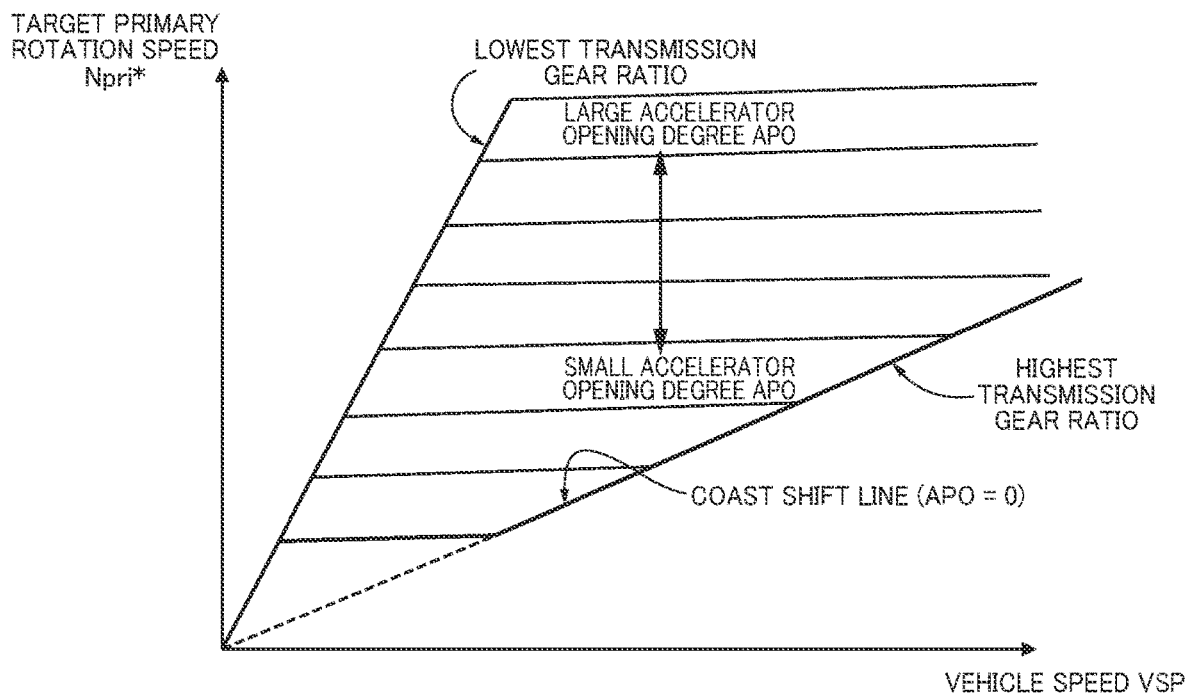
FIG. 2 is a shift schedule diagram showing one example of a shift schedule used when a normal shift control is performed in a variator in the first embodiment.

FIG. 2 shows one example of a shift schedule used when the normal shift control is performed in the variator 4 in the first embodiment.

The normal shift control is performed in the CVT control unit 8. The CVT control unit 8 is configured to calculate the target primary rotation speed Npri* by a driving point (VSP, APO) determined on the shift schedule of FIG. 2 from the vehicle speed VSP sensed by the vehicle speed sensor 81, and the accelerator opening degree APO sensed by the accelerator opening degree sensor 86. After the calculation of the target primary rotation speed Npri*, the CVT control unit 8 is configured to perform a feedback control so that an actual primary rotation speed sensed by the primary rotation speed sensor 80 corresponds to the calculated target primary rotation speed Npri*.

As shown in FIG. 2, the shift schedule is set so that the transmission gear ratio is continuously varied in a range of a transmission gear ratio width from a lowest transmission gear ratio to a highest transmission gear ratio, in accordance with a driving point (VSP, APO). For example, in a case where the accelerator depression is performed when the vehicle speed VSP is constant, the target primary rotation speed Npri* is increased to be shifted in a downshift direction. On the other hand, in a case where the accelerator return operation is performed when the vehicle speed VSP is constant, the target primary rotation speed Npri* is decreased to be shifted in the upshift direction. Moreover, when the accelerator opening degree APO is constant, the shift is performed in the upshift direction by the increase of the vehicle speed VSP. Furthermore, when the accelerator opening degree APO is constant, the shift is performed in the downshift direction by the decrease of the vehicle speed VSP. A coast shift line shown in FIG. 2 is a line for determining a target primary rotation speed Npri* when the accelerator release operation is performed during the normal shift control.

The minimum rotation speed restriction control is a shift control to previously set the minimum engine speed to correspond to a restriction minimum rotation speed determined based on the engine cooling water temperature so as to satisfy the engine rotation speed condition during the fuel cut control. That is, the minimum rotation speed restriction control is a shift control to increase the minimum engine speed. The minimum rotation speed restriction control is the shift control having an object different from an object of the normal shift control to determine the target primary rotation speed Npri* to obtain a good traveling drive characteristic by the driving point (VSP, APO). Besides, the primary rotation speed Npri corresponds to the engine rotation speed Ne during the lockup traveling in which the forward clutch 31 and the lockup clutch 20 are in the engagement state in the selection of the D range. Accordingly, for example, when the primary rotation speed Npri of the variator 4 is increased by the downshift, the engine speed Ne is increased to follow the increase of the primary rotation speed Npri.

Figure 3:
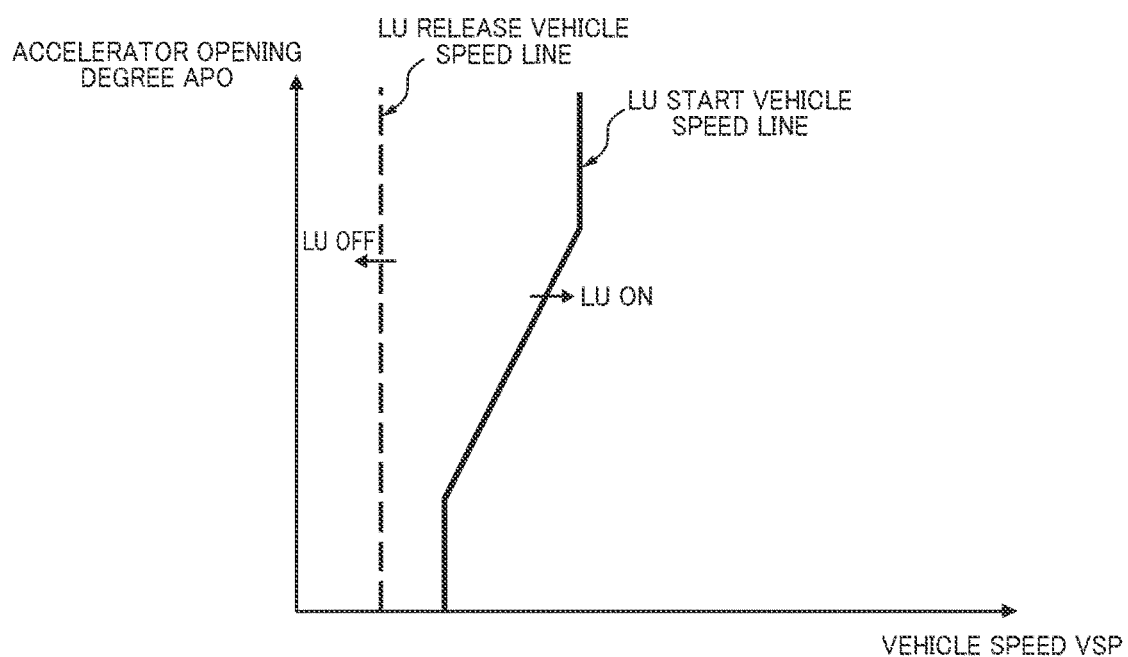
FIG. 3 is a lockup schedule diagram showing one example of a lockup schedule used when a lockup control is performed in a lockup clutch installed in a torque converter 1 in the first embodiment.

FIG. 3 shows one example of a lockup schedule used when the lockup control is performed in the lockup clutch 20 of the torque converter 2 in the first embodiment. Hereinafter, a lockup control configuration is explained with reference to FIG. 3. Besides, "LU" in below-explanations represents "lockup".

The lockup control is performed in the CVT control unit 8 similarly to the normal shift control. The CVT control unit 8 is configured to determine the lockup engagement (LU ON) or the lockup disengagement (LU OFF) by the driving point (VSP, APO) determined on the lockup schedule of FIG. 3 by the vehicle speed VSP sensed by the vehicle speed sensor 81, and the accelerator opening degree APO sensed by the accelerator opening degree sensor 86. After the determination of the lockup engagement (LU ON) or the lockup disengagement (LU OFF), the CVT control unit 8 is configured to perform the lockup pressure difference control to proceed to the clutch engagement or the clutch disengagement.

As shown in FIG. 3, in the lockup schedule, the control of the engagement and the disengagement is performed in accordance with an LU start vehicle speed line (OFF→ON) set in a low vehicle speed region (for example, about 10 km/h to 20 km/h), and an LU release vehicle speed line (ON→OFF) set in a vehicle speed region lower than the LU start vehicle speed line. For example, in a case where the driving point (VSP, APO) in the LU OFF region is moved across the LU start vehicle speed line by the increase of the vehicle speed VSP, the engagement control of the lockup clutch 20 is started to enter the LU ON region, based on the output of the clutch engagement command. On the other hand, in a case where the driving point (VSP, APO) in the LU ON region is moved across the LU release vehicle speed line by the decrease of the vehicle speed VSP, the disengagement control of the lockup clutch 20 is started to enter the LU OFF region, based on the output of the clutch disengagement command.

[Fuel Cut Control Process Configuration]

Figure 4:
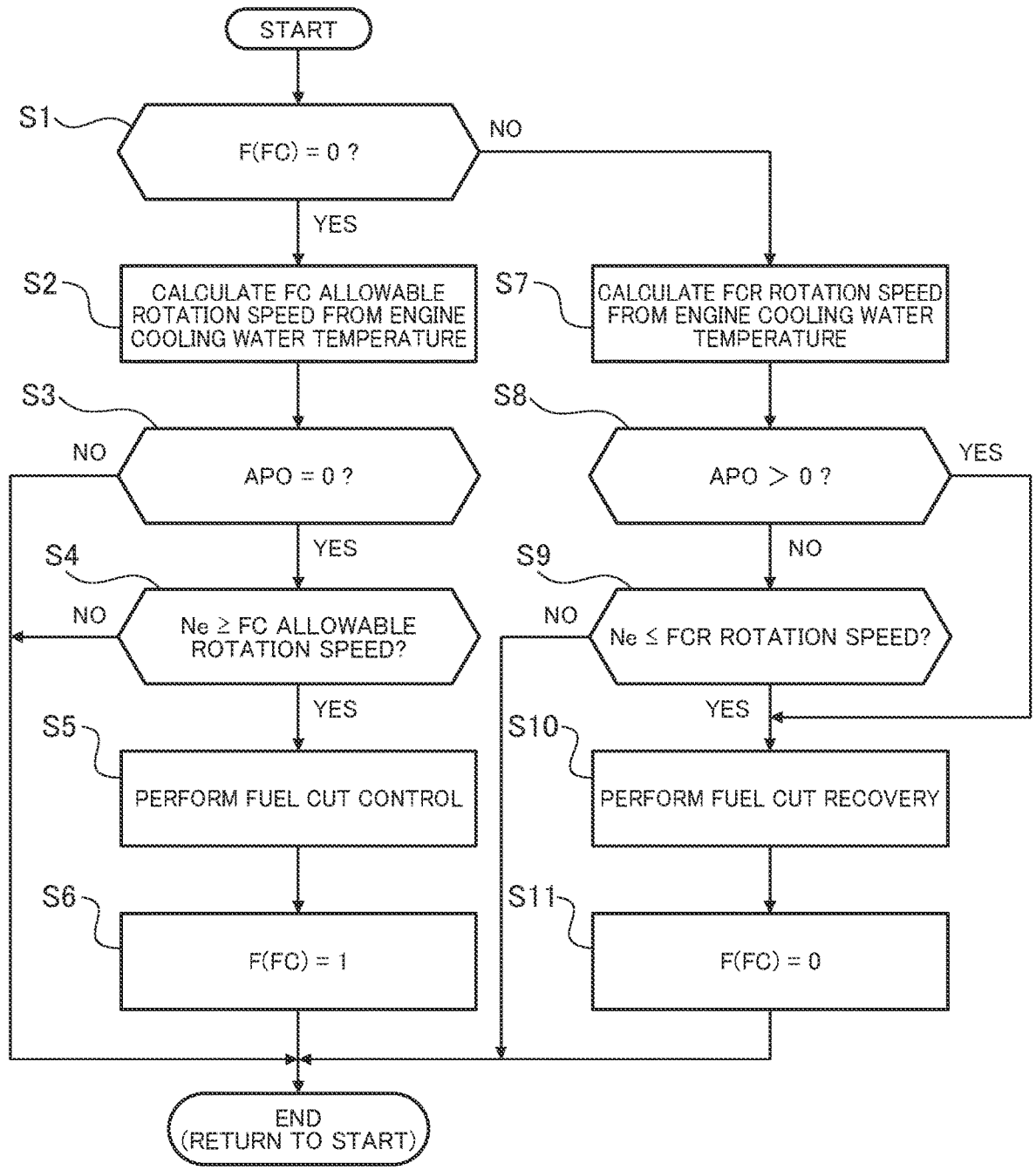
FIG. 4 is a flowchart showing a flow of a fuel cut control process performed in an engine control unit in the first embodiment.

FIG. 4 shows a flow (fuel cut control means) of a fuel cut control process performed in the engine control unit 88 in the first embodiment. Hereinafter, steps of FIG. 4 representing the fuel cut control process configuration are explained. Besides, in below-explanations, "fuel cut allowable rotation speed" is referred to as "FC allowable rotation speed". "Fuel cut recovery rotation speed" is referred to as "FCR rotation speed".

At step S1, it is judged whether or not a fuel cut flag (FC) is F(FC)=0. In case of YES (F(FC)=0), the process proceeds to step S2. In case of NO (F(FC)=1), the process proceeds to step S7.

In this case, the fuel cut flag F(FC)=0 means that the engine 1 in the fuel injection state (the normal driving state). The fuel cut flag F(FC)=1 means that the fuel injection to the engine 1 is in the stop state by the fuel cut control.

At step S2, subsequently to the judgment of F(FC)=0 at step S1, the FC allowable rotation speed is calculated by the engine cooling water temperature. The process proceeds to step S3.

In this case, the information of the engine cooling water temperature Te is obtained from the sensor value of the engine cooling water temperature sensor 13. The FC allowable rotation speed is calculated by using the engine cooling water temperature Te and an FC allowable rotation speed characteristic shown by a solid line in FIG. 6. The FC allowable rotation speed is the engine rotation speed Ne corresponding to the engine cooling water temperature Te at that time. Besides, the FC allowable rotation speed characteristic by the solid line in FIG. 6 is set based on the minimum engine speed by which the engine stall is not generated when the fuel cut control is started.

Figure 6:
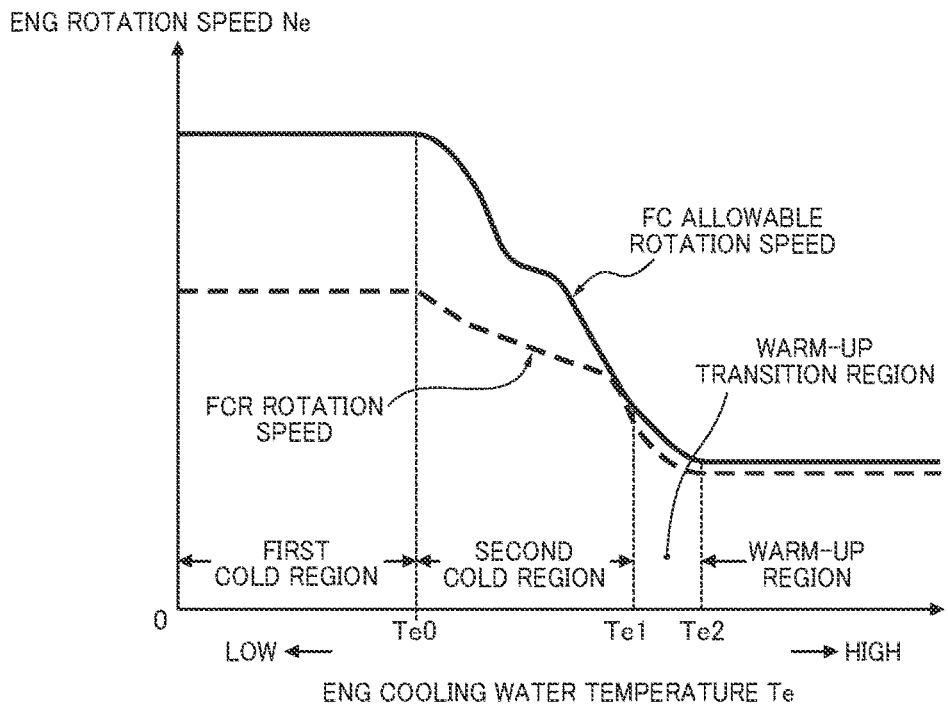
FIG. 6 is a map characteristic view showing one example of an FC allowable rotation speed characteristic and an FCR rotation speed characteristic with respect to an engine cooling water temperature used when an FC allowable rotation speed and an FCR rotation speed are calculated in fuel cut control process and in the shift control process in the first embodiment.

As shown in FIG. 6, in the FC allowable rotation speed characteristic map, the FC allowable rotation speed is defined by the constant high engine speed Ne (for example, about 3000 rpm) in a first cold region in which the engine cooling water temperature Te is Te≤Te0 (for example, Te0=about 0 degree). In a second cold region in which the engine cooling water temperature Te is Te0<Te≤Te1 (for example, Te1=about 48 degrees), the FC allowable rotation speed is defined by the engine speed Ne decreased as the engine cooling water temperature Te is higher. In a warm-up transition region in which the engine cooling water temperature Te is Te1<Te≤Te2 (for example, Te2=about 60 degrees), the FC allowable rotation speed is defined by the engine speed Ne decreased along the FCR rotation speed as the engine cooling water temperature Te is higher. In a warm-up region in which the engine cooling water Te is Te>Te2, the FC allowable rotation speed is defined by a constant low engine speed Ne (for example, about 925 rpm).

At step S3, subsequently to the calculation of the FC allowable rotation speed by the engine cooling water temperature at step S2, it is judged whether or not the accelerator opening degree APO is APO=0. In case of YES (APO=0), the process proceeds to step S4. In case of NO (APO>0), the process proceeds to an end, and returns to the start.

In this case, the information of the accelerator opening degree APO is obtained from the sensor value of the accelerator opening degree sensor 86. "APO=0" means an accelerator release state in which the foot of the driver is released from the accelerator pedal. "APO>0" means an accelerator operation state in which the driver puts the foot on the accelerator pedal, and depresses the accelerator pedal.

At step S4, subsequently to the judgment of APO=0 at step S3, it is judged whether or not the engine rotation speed Ne at this time is equal to or greater than the FC allowable rotation speed calculated at step S2. In case of YES (Ne≥the FC allowable rotation speed), the process proceeds to step S5. In case of NO (Ne<the FC allowable rotation speed), the process proceeds to the end, and returns to the start.

In this case, the information of the engine rotation speed Ne is obtained from the sensor value from the engine rotation speed sensor 12.

At step S5, subsequently to the judgment of Ne≥the FC allowable rotation speed, the fuel cut control is performed to shut off the fuel injection to the engine 1. The process proceeds to step S6.

In this case, when the fuel cut control is performed, the fuel cut signal (FC signal) is outputted to the fuel injection actuator 10.

At step S6, subsequently to the fuel cut control at step S5, the fuel cut flag F(FC) is set from F(FC)=0 to F(FC)=1. The process proceeds to the end, and returns to the start.

At step S7, subsequently to the judgment of F(FC)=0 at step S1, the FCR rotation speed is calculated from the engine cooling water temperature. The process proceeds to step S8.

In this case, the information of the engine cooling water temperature Te is obtained from the sensor value from the engine cooling water temperature sensor 13. The FCR rotation speed is calculated by using the engine cooling water temperature Te and the FCR rotation speed characteristic shown by a broken line of FIG. 6. The FCR rotation speed is the engine speed Ne corresponding to the engine cooling water temperature Te at that time. The FCR rotation speed characteristic is set based on the minimum engine speed by which the engine stall is not generated when the engine rotation speed is decreased during the fuel cut control is performed.

As shown in FIG. 6, in the FCR rotation speed characteristic map, the FCR rotation speed is defined by the constant high engine speed Ne (for example, about 2000 rpm) in the first cold region in which the engine cooling water temperature Te is Te≤Te0 (for example, Te0=about 0 degree). In the second cold region in which the engine cooling water temperature Te is Te0<Te≤Te1 (for example, Te1=about 48 degrees), the FCR rotation speed is defined by the engine speed Ne decreased as the engine cooling water temperature Te is higher. In the warm-up transition region in which the engine cooling water temperature Te is Te1<Te≤Te2 (for example, Tet=about 60 degrees), the FCR rotation speed is defined by the engine speed Ne decreased along the FC allowable rotation speed as the engine cooling water temperature Te is higher. In the warm-up region in which the engine cooling water Te is Te>Te2, the FCR rotation speed is defined by a constant low engine speed Ne (for example, about 850 rpm). That is, the FCR rotation speed characteristic is a characteristic to be closer to the FC allowable rotation speed characteristic to keep the rotation speed slightly lower than the FC allowable rotation speed characteristic, after the warm-up transition region.

At step S8, subsequently to the calculation of the FCR rotation speed by the engine cooling water temperature at step S7, it is judged whether or not the accelerator opening degree APO is APO>0. In case of YES (APO>0), the process proceeds to step S10. In case of NO (APO=0), the process proceeds to step S9.

At step S9, subsequently to the judgment of APO=0 at step S8, it is judged whether or not the engine rotation speed Ne at this time is equal to or smaller than the FCR rotation speed calculated at step S7. In case of YES (Ne≤the FCR rotation speed), the process proceeds to step S10. In case of NO (Ne>the FCR rotation speed), the process proceeds to the end, and returns to the start.

At step S10, subsequently to the judgment of APO>0 at step S8 or the judgment of Ne≤the FCR rotation speed at step S9, the fuel cut recovery control is performed to reinject the fuel to the engine 1. The process proceeds to step S11.

In this case, when the fuel cut recovery control is performed, the fuel cut recovery signal (FCR signal) is outputted to the fuel injection actuator 10.

At step S11, subsequently to the fuel cut recovery control at step S10, the fuel cut flag F(FC) is set from F(FC)=1 to F(FC)=0. The process proceeds to the end, and returns to the start.

[Shift Control Process Configuration]

Figure 5:
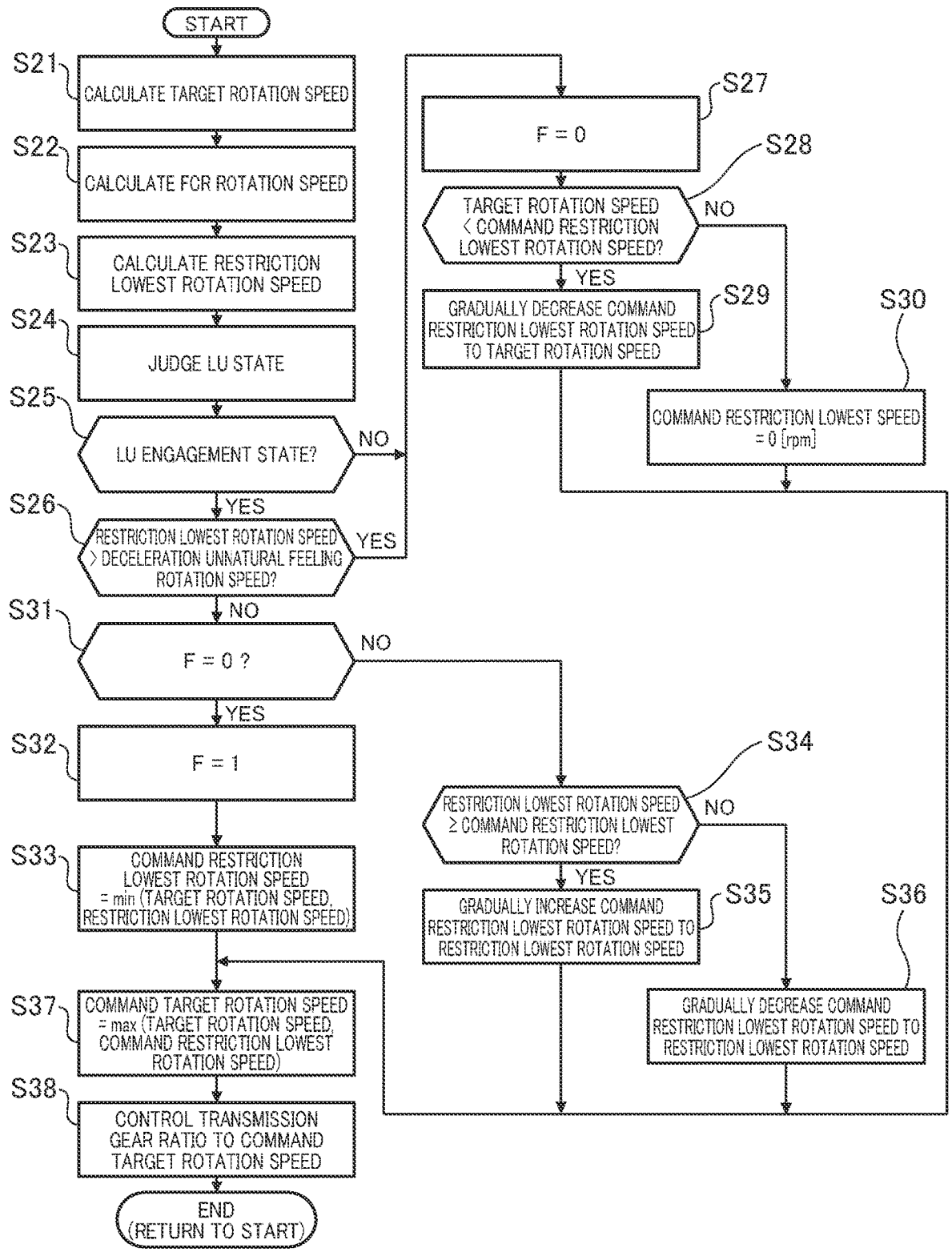
FIG. 5 is a flowchart showing a flow of a shift control process by a combination of a minimum rotation speed restriction control and a normal shift control which are performed in a CVT control unit in the first embodiment

FIG. 5 shows a flow of the shift control process by a combination of the normal shift control and the minimum rotation speed restriction control which are performed in the CVT control unit 8 in the first embodiment. Hereinafter, steps of FIG. 5 which represents the shift control process configuration are explained (shift control means).

At step S21, a target rotation speed is calculated. The process proceeds to step S22.

In this case, the "target rotation speed" is the target primary rotation speed Npri* calculated by the driving point (VSP, APO) in the normal shift control.

At step S22, subsequently to the calculation of the target rotation speed at step S21, the FCR rotation speed is calculated. The process proceeds to step S23.

In this case, the calculation of the FCR rotation speed is identical to that at step S7. That is, the FCR rotation speed is calculated by the engine cooling water temperature. The information of the engine cooling water temperature Te is obtained from the sensor value from the engine cooling water temperature sensor 13. The FCR rotation speed is calculated by using the engine cooling water temperature Te and the FCR rotation speed characteristic shown by the broken line of FIG. 6. The FCR rotation speed is the engine speed Ne corresponding to the engine cooling water temperature Te at that time.

At step S23, subsequently to the calculation of the FCR rotation speed at step S22, the restriction minimum rotation speed is calculated. The process proceeds to step S24.

In this case, the "restriction minimum rotation speed" is a minimum engine speed which is a target at the operation of the minimum rotation speed restriction control. This restriction minimum rotation speed is the engine speed obtained by adding a predetermined value α to the FCR rotation speed calculated at step S22. This predetermined value α is an addition value (for example, about α=200 rpm) for setting (maintaining) the restriction minimum rotation speed so as not to be smaller than the FC allowable rotation speed and the FCR rotation speed even when the engine speed is varied due to the shift variation of the variator 4, and the variation of the sensor value from the engine speed sensor 12.

At step S24, subsequently to the calculation of the restriction minimum rotation speed at step S23, the state (the full engagement state, the slip engagement state, and the disengagement state) of the lockup clutch 20 is judged. The process proceeds to step S25.

At step S25, subsequently to the judgment of the LU state at step S24, it is judged whether or not the lockup clutch 20 is in the engagement state (the full engagement state or the slip engagement state). In case of YES (the LU engagement state), the process proceeds to step S26. In case of NO (the LU disengagement state), the process proceeds to step S27.

In this case, the engagement state is judged by monitoring the engine speed and the turbine rotation speed (=the primary rotation speed). For example, when the engine rotation speed corresponds to the turbine rotation speed, and when a predetermined time period is elapsed in the state where the engine rotation speed corresponds to the turbine rotation speed, it is judged that the lockup clutch 20 is brought to the full engagement state.

At step S26, subsequently to the judgment of the LU engagement state at step S25, it is judged whether or not the restriction minimum rotation speed calculated at step S23 exceeds a predetermined deceleration unnatural feeling rotation speed. In case of YES (the restriction minimum rotation speed>the deceleration unnatural feeling rotation speed), the process proceeds to step S27. In case of NO (the restriction minimum rotation speed≤the deceleration unnatural feeling rotation speed), the process proceeds to step S31.

In this case, the "deceleration unnatural feeling rotation speed" is an engine speed value which is an upper limit by which the engine speed at this time is increased by the downshift of the variator 4 without the unnatural feeling of the deceleration.

At step S27, subsequently to the judgment of the LU disengagement state at step S25 or the judgment of the restriction minimum rotation speed>the deceleration unnatural feeling rotation speed at step S26, a minimum rotation speed restriction control flag F is set to F=0 when the minimum rotation speed control flag F is F=1, and the minimum rotation speed restriction control flag F is maintained to F=0 when the minimum rotation speed control flag F is F=0. The process proceeds to step S28.

In this case, the minimum rotation speed restriction control flag F=0 means that the minimum rotation speed restriction control is not performed. The minimum rotation speed restriction control flag F=1 means that the minimum rotation speed restriction control is performed.

At step S28, subsequently to the setting of F=0 at step S27, it is judged whether or not the target rotation speed calculated at step S21 is smaller than a command restriction minimum rotation speed. In case of YES (the target rotation speed<the command restriction minimum rotation speed), the process proceeds to step S29. In case of NO (the target rotation speed≥the command restriction minimum rotation speed), the process proceeds to step S30.

In this case, the "command restriction minimum rotation speed" is a minimum engine speed actually restricted by the operation of the minimum rotation speed restriction control.

At step S29, subsequently to the judgment of the target rotation speed<the command restriction minimum rotation speed at step S28, the command restriction minimum rotation speed is gradually decreased to the target rotation speed. The process proceeds to step S37.

In this case, "the command restriction minimum rotation speed is gradually decreased to the target rotation speed" means that the shift speed is restricted so as not to provide the unnatural feeling due to the variation of the decrease of the engine speed when the engine speed is decreased to the target rotation speed by the upshift of the variator 4.

At step S30, subsequently to the judgment of the target rotation speed≥the command restriction minimum rotation speed at step S28, the command restriction minimum rotation speed is set to the command restriction minimum rotation speed=0. The process proceeds to step S37.

At step S31, subsequently to the judgment of the restriction minimum rotation speed≤the deceleration unnatural feeling rotation speed at step S26, it is judged whether or not the minimum rotation speed restriction control flag F is F=0. In case of YES (F=0), the process proceeds to step S32. In case of NO (F=1), the process proceeds to step S34.

At step S32, subsequently to the judgment of F=0 at step S31, the minimum rotation speed restriction control flag F is set from F=0 to F=1. The process proceeds to step S33.

At step S33, subsequently to the setting of F=1, the smaller engine speed value of the target rotation speed calculated at step S21, and the restriction minimum rotation speed calculated at step S23 is set to the command restriction minimum rotation speed. The process proceeds to step S37.

At step S34, subsequently to the judgment of F=1 at step S31, it is judged whether or not the restriction minimum rotation speed is equal to or greater than the command restriction minimum rotation speed. In case of YES (the restriction minimum rotation speed≥the command restriction minimum rotation speed), the process proceeds to step S35. In case of NO (the restriction minimum rotation speed<the command restriction minimum rotation speed), the process proceeds to step S36.

At step S35, subsequently to the judgment of the restriction minimum rotation speed≥the command restriction minimum rotation speed at step S34, the command restriction minimum rotation speed is gradually increased to the restriction minimum rotation speed. The process proceeds to step S37.

In this case, "the command restriction minimum rotation speed is gradually increased to the restriction minimum rotation speed" means that the shift speed is restricted so as not to provide the unnatural feeling due to the variation of the increase of the engine speed when the engine speed is increased by the downshift of the variator 4.

At step S36, subsequently to the judgment of the restriction minimum rotation speed<the command restriction minimum rotation speed at step S34, the command restriction minimum rotation speed is gradually decreased to the restriction minimum rotation speed. The process proceeds to step S37.

In this case, "the command restriction minimum rotation speed is gradually decreased to the restriction minimum rotation speed" means that the engine speed is decreased by the upshift of the variator 4 along the restriction minimum rotation speed gradually decreased by the increase of the engine water cooling temperature.

At step S37, subsequently to one of the settings of the command restriction minimum rotation speed at steps S29, S30, S33, S35, and S36, the larger engine rotation speed value of the target rotation speed calculated at step S21, and the set command restriction minimum rotation speed is set to the command target rotation speed. The process proceeds to step S38.

In this case, "the command target rotation speed" is the target engine rotation speed which is finally commanded.

At step S38, subsequently to the setting of the command target rotation speed at step S37, the transmission gear ratio of the variator 4 is controlled so that the engine speed at this time becomes the command target rotation speed. The process proceeds to the end, and returns to the start.

In this case, the variator 4 is controlled to be downshifted for increasing the engine speed. The variator 4 is controlled to be upshifted for decreasing the engine speed.

Next, operations are explained.

The operations in the first embodiment are explained with reference to "fuel cut control process operation", "shift control process operation", "fuel cut control operation", "minimum rotation speed restriction control operation", and "characteristic operation of minimum rotation speed restriction control".

[Fuel Cut Control Operations]

The fuel cut control process operation is to shut off the fuel injection to the engine 1 for improving the fuel economy in the engine 1. This fuel cut control process operation is explained with reference to the flowchart shown in FIG. 4.

First, when the engine 1 is in the normal driving state (F(FC)=0) by the fuel injection, the process proceeds along step S1→step S2→step S3→step S4 in the flowchart of FIG. 4. At step S3 and step S4, the fuel cut entering condition is judged.

In this case, the entering condition of the fuel cut control is satisfied when the accelerator release condition in which the accelerator opening degree APO is APO=0, and the engine rotation speed condition in which the engine speed is equal to or greater than the FC allowable rotation speed are both satisfied. Accordingly, the accelerator release condition is not satisfied during the accelerator depression operation. The process repeats the flow of step S1→step S2→step S3→the end. The fuel cut control is not started. When the engine speed is smaller than the FC allowable rotation speed even when the accelerator release operation is performed, the process repeats the flow of step S1→step S2→step S3→step S4→the end. The fuel cut control is not started.

On the other hand, when the accelerator release condition and the engine rotation speed condition are both satisfied, the process proceeds along step S1→step S2→step S3→step S4→step S5→step S6. At step S5, the fuel cut control to shut off the fuel injection to the engine 1 is started. At next step S6, the fuel cut flag F(FC) is set from F(FC)=0 to F(FC)=1.

During the fuel cut control (F(FC)=1), the process proceeds along step S1→step S7→step S8→step S9 in the flowchart of FIG. 4. At step S8 and S9, the fuel cut exiting condition is judged.

In this case, the exiting condition of the fuel cut control is satisfied when one of the accelerator depression condition in which the accelerator opening degree APO is APO>0, and the engine rotation speed condition in which the engine speed is equal to or smaller than the FCR rotation speed is satisfied. Accordingly, when the engine speed is not decreased to the FCR rotation speed in the accelerator release state, the process repeats the flow of step S1→step S7→step S8→step S9→the end. The fuel cut operation is maintained.

On the other hand, when the accelerator depression condition is satisfied during the fuel cut control, the process proceeds along step S1→step S7→step S8→step S10→step S11. Moreover, when the engine speed is decreased to be equal to or smaller than the FCR rotation speed during the fuel cut control by the release of the accelerator, the process proceeds along step S1→step S7→step S8→step S9→step S10→step S11. In both cases, at step S10, the fuel cut recovery control to reinject the fuel to the engine 1 is started. At next step S11, the fuel cut flag F(FC) is set from F(FC)=1 to F(FC)=0.

In this way, in the fuel cut control process, the engine speed condition, the entering condition, and the exiting condition are included in addition to the accelerator operation condition. Accordingly, in the normal engine driving state by the fuel injection, when the engine speed condition is not satisfied even when the accelerator release condition is satisfied, the fuel cut control is not started. Consequently, for increasing the frequency of the start of the fuel cut control, it is necessary to make a situation in which the engine rotation speed condition is satisfied, in the normal engine driving state by the accelerator depression operation.

During the fuel cut control, when the engine speed condition is not satisfied even when the accelerator release condition is maintained to be satisfied, the fuel cut recovery control is started. Accordingly, for maintaining the fuel cut control until the next accelerator depression operation timing, it is necessary to make a situation in which the engine rotation speed is satisfied during the fuel cut control by the accelerator release operation.

[Shift Control Process Operation]

The shift control process operation to control the transmission gear ratio of the variator 4 is explained based on the flowchart shown in FIG. 5. Besides, the shift control operation includes the minimum rotation speed restriction control operation to make the situation in which the engine rotation speed condition is satisfied, regardless of the accelerator operation condition, for increasing the traveling scene in which the fuel cut control is performed.

During the traveling at the selection of the D range, the process proceeds along step S21→step S22→step S23→step S24→step S25→step S26 in the flowchart of FIG. 5. At step S25 and step S26, the start condition during the non-operation of the minimum rotation speed restriction control (F=0), and the cancel condition during the operation of the minimum rotation speed restriction control (F=1) are judged. At step S21, the target rotation speed is calculated.

At step S22, the FCR rotation speed is calculated by the engine cooling water temperature Te is calculated. At step S23, the restriction minimum rotation speed (=FCR rotation speed+α) is calculated. At step S24, the state of the lockup clutch 20 is judged. At step S25, it is judged whether or not the lockup clutch 20 is in the engagement state. At step S26, it is judged whether or not the restriction minimum rotation speed exceeds the deceleration unnatural feeling rotation speed.

That is, at F=0, the start condition is the lockup engagement state, and the restriction minimum rotation speed>the deceleration unnatural feeling rotation speed. When the start condition is satisfied, the minimum rotation speed restriction control is started. The process proceeds to the minimum rotation speed restriction control process after step S31. At F=1, the cancel condition is the lockup disengagement state, or the restriction minimum rotation speed≤the deceleration unnatural feeling rotation speed. When at least one of the cancel conditions is satisfied, the minimum rotation speed restriction control is canceled. The process proceeds to the minimum rotation speed restriction control cancel process after the step S27.

When the start condition is not satisfied before the start of the minimum rotation speed restriction condition, the process repeats the flow of step S25 or step S26→step S27→step S28→step S30→step S37→step S38→the end. At step S27, the minimum rotation speed restriction control flag F is set to F=0. At step S28, the target rotation speed≥the command restriction minimum rotation speed is judged. At step S30, the command restriction minimum rotation speed is set to the command restriction minimum rotation speed=0. Accordingly, at step S37, the command target rotation speed is set to the target rotation speed. At next step S38, the transmission gear ratio of the variator 4 is controlled so that the engine speed at this time becomes the target rotation speed (the normal shift control of the variator 4).

At a first time when the start condition of the minimum rotation speed restriction control is satisfied, the process proceeds along step S21 to step S26→step S31→step S32→step S33→step S37→step S38→the end. At step S31, it is judged whether or not the minimum rotation speed restriction control flag F is F=0. In case of F=0, the process proceeds to step S32. At step S32, the minimum rotation speed restriction flag F is set from F=0 to F=1. At next step S33, the smaller engine speed value of the target rotation speed calculated at step S21, and the restriction minimum rotation speed calculated at step S23 is set to the command restriction minimum rotation speed. At step S37, the command target rotation speed is set to the set command restriction minimum rotation speed. At step S38, the transmission gear ratio of the variator 4 is started so that the engine speed at this time becomes the command target rotation speed (the minimum rotation speed restriction control start of the variator 4).

When F=1 is satisfied at the satisfaction of the start condition, during the restriction minimum rotation speed≥the command restriction minimum rotation speed, the process proceeds repeats the flow of step S21 to step S26→step S31→step S34→step S35→step S37→step S38→the end. At step S35, the command restriction minimum rotation speed is set to a value gradually increased to the restriction minimum rotation speed. At step S37, the command target rotation speed is set to the set command restriction minimum rotation speed. At step S38, the variator 4 is controlled to be downshifted so that the rotation speed at this time becomes the command target rotation speed. That is, the variator 4 is downshifted so that the engine speed is gradually increased until the engine speed becomes the restriction minimum rotation speed (the minimum rotation speed restriction downshift control of the variator 4).

When F=1 is satisfied at the satisfaction of the start condition, and when the restriction minimum rotation speed<the command restriction minimum rotation speed is satisfied, the process proceeds repeats the flow of step S21 to step S26→step S31→step S34→step S36→step S37→step S38→the end. At step S36, the command restriction minimum rotation speed is set to a value gradually decreased to the restriction minimum rotation speed. At step S37, the command target rotation speed is set to the set command restriction minimum rotation speed. At step S38, the variator 4 is controlled to be upshifted so that the rotation speed at this time becomes the command target rotation speed. That is, the variator 4 is upshifted so that the engine speed is along the restriction minimum rotation speed which is gradually decreased, after the engine speed reaches the restriction minimum rotation speed (the minimum rotation speed restriction upshift control of the variator 4).

When the cancel condition at step S25 or step S26 is satisfied at F=1, the process proceeds repeats the flow of step S25 or step S26 to step S27→step S28→step S29→step S37→step S38→the end. At step S27, the minimum rotation speed restriction control flag F is set to F=0. At step S28, the target rotation speed≥the command restriction minimum rotation speed is judged. At next step S29, the command restriction minimum rotation speed is set to be gradually decreased to the target rotation speed. Accordingly, at step S37, the command target rotation speed is set to the command restriction minimum rotation speed. At next step S38, the transmission gear ratio of the variator 4 is controlled so that the engine speed at this time becomes the command target rotation speed (the command restriction minimum rotation speed) (the recovery control to return the variator 4 to the normal shift control).

In this way, in the shift control of the variator 4, the normal shift control of the variator 4 is maintained until the start condition of the minimum rotation speed restriction control is satisfied. Then, when the start condition of the minimum rotation speed restriction control is satisfied, the shift control of the variator 4 to increase and restrict the minimum rotation speed of the engine speed is intervened so as to maintain the engine speed to ensure the fuel cut control. Moreover, when the cancel condition of the minimum rotation speed restriction control is satisfied, the recovery control is performed to return the variator 4 to the normal shift control while suppressing the variation of the engine speed.

[Fuel Cut Control Operation]

First, the engine speed condition which is one of the entering conditions of the fuel cut control is satisfied at the engine speed≥the FC allowable rotation speed. Then, it is necessary to maintain the engine speed>the FCR rotation speed for not satisfying the engine speed condition which is one of the exiting conditions of the fuel cut control. Accordingly, when the engine speed at the accelerator release operation is equal to or greater than the FC allowable rotation speed before the fuel cut control, the fuel cut control is started. Then, when the engine speed is maintained to exceed the FCR rotation speed during the fuel cut control by the accelerator release, the fuel cut control is maintained.

On the other hand, the FC allowable rotation speed characteristic and the FCR rotation speed characteristic are the variable values according to the engine cooling water temperature Te, as shown in FIG. 6. In this case, when the engine cooling water temperature Te is in the first cold region and the second cold region in which the engine cooling water temperature Te is equal to or smaller than Te1, a deviation width between the FC allowable rotation speed and the engine speed (=the idling rotation speed) at the accelerator release is large. With this, the deceleration unnatural feeling is generated at the downshift of the variator 4. Accordingly, the first cold region and the second cold region are set to the non-operation region in which the minimum rotation speed restriction control is not performed. The warm-up transition region and the warm-up region are set to the operation region in which the minimum rotation speed restriction control is performed.

Figure 7:
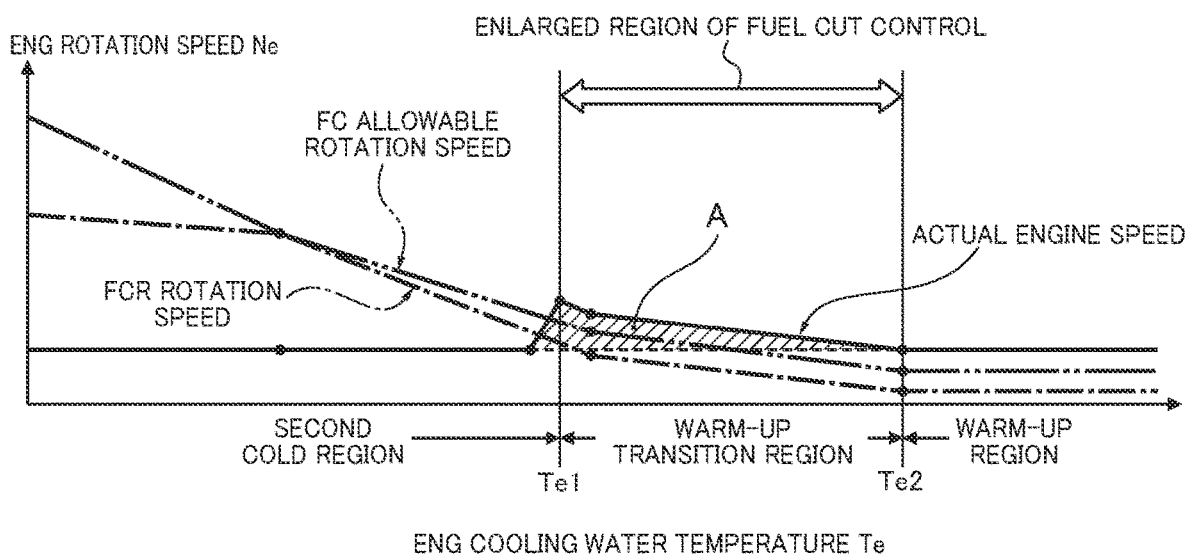
FIG. 7 is a rotation speed relationship characteristic view showing a relationship between characteristics of an actual engine speed, the FC allowable rotation speed, and the FCR rotation speed when the accelerator pedal is released when the engine cooling water temperature is in a second cold region, a warm-up transition region, and a warm-up region.

Moreover, the warm-up transition region of the operation region of the minimum rotation speed restriction control is a region in which the minimum engine speed is increased and restricted by the operation of the minimum rotation speed restriction control, as shown in a hatching A of FIG. 7. Furthermore, in the warm-up region of the operation region of the minimum rotation speed restriction control, even when the actual engine speed is the idling rotation speed in the normal shift control, the actual engine speed is greater than the FC allowable rotation speed and the FCR rotation speed, as shown in FIG. 7. Accordingly, the warm-up region is substantially a region in which the minimum rotation speed restriction control is not operated. That is, the warm-up transition region is substantially a region in which the minimum rotation speed restriction control is operated.

Accordingly, in case of a comparative example in which the only normal shift control is performed as the shift control, the fuel cut control is not performed when the engine cooling water temperature Te is not increased to enter the warm-up region of Te>Te2. Contrary to this comparative example, in the first embodiment, when the engine cooling water temperature Te enters the warm-up transition region of Te1<Te≤Te2 before entering the warm-up region. The minimum engine speed is increased and restricted by the operation of the minimum rotation speed restriction control. Consequently, in the first embodiment, the fuel cut control is performed when the engine cooling water temperature Te enters the warm-up transition region without waiting for entering the warm-up region. That is, the warm-up transition region is an enlarged region of the fuel cut control with respect to the comparative example.

[Minimum Rotation Speed Restriction Control Operation]

Figure 8:
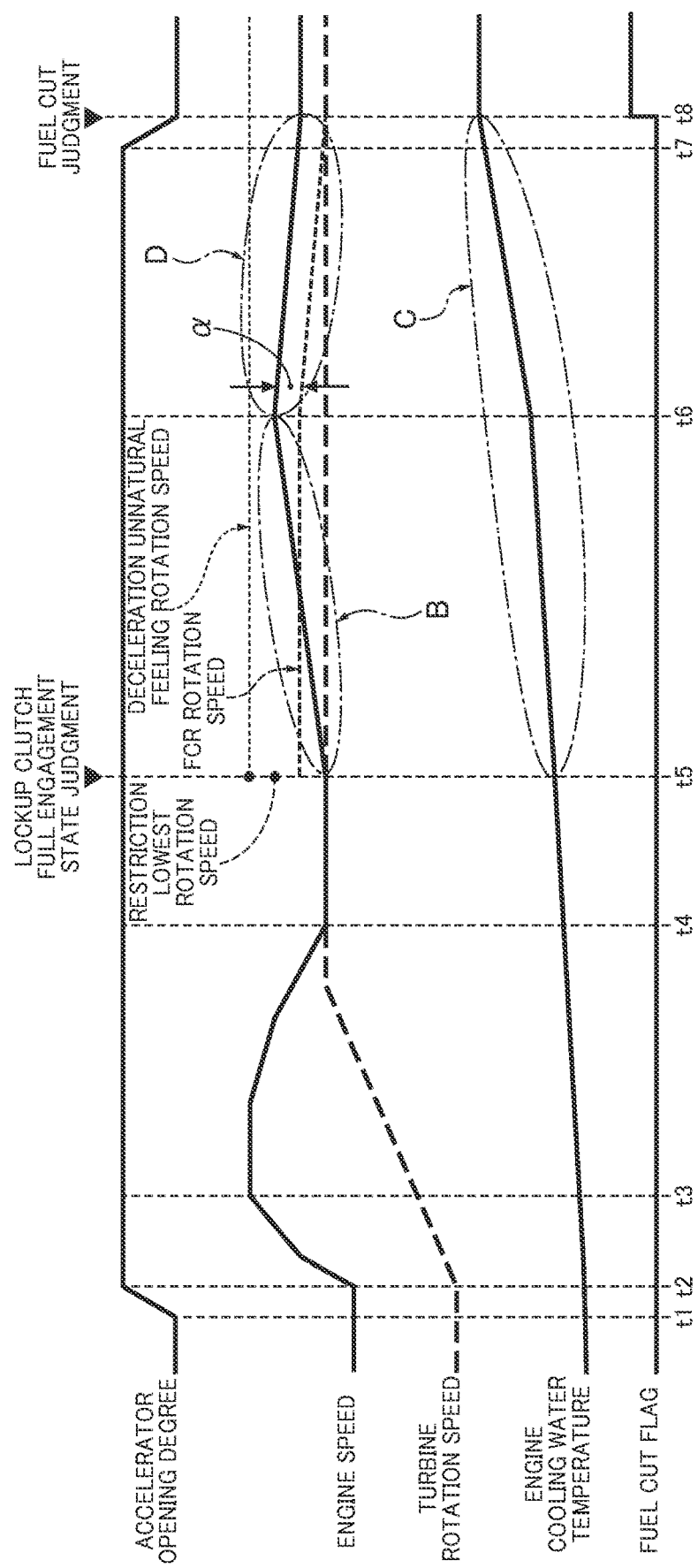
FIG. 8 is a time chart showing characteristics of an accelerator opening degree, the engine speed, a turbine rotation speed, the engine cooling water temperature, and a fuel cut flag in a start travel scene in which the engine cooling water temperature is in the warm-up transition region, and in which a minimum rotation speed restriction control is operated.

FIG. 8 is a time chart showing characteristics in a start traveling scene in which the engine cooling water is in the warm-up transition region, and in which the minimum rotation speed restriction control is performed.

During the stop of the vehicle, the depression operation of the accelerator pedal is started at time t1. The vehicle is started by maintaining the predetermined accelerator opening from time t2. In this case, the lockup clutch 20 of the torque converter 2 is in the disengagement state. Accordingly, the engine speed is suddenly increased from time t2. The turbine rotation speed is started to be gradually increased to follow the increase of the vehicle speed. Then, when the engagement of the lockup clutch 20 is started by the increase of the vehicle speed at time t3, the turbine rotation speed is gradually increased to follow the increase of the vehicle speed. On the other hand, the engine speed is started to be decreased. When the lockup clutch 20 is brought to the full engagement state at time t4, the decreasing engine speed corresponds to the increasing turbine rotation speed. Then, it is judged that the lockup clutch 20 in the full engagement state at time t5 at which a predetermined time period is elapsed in a state where the engine speed is maintained to correspond to the turbine rotation speed.

At time t5, the start condition of the minimum rotation speed restriction control in which the engagement state is in the LU engagement state, and in which the restriction minimum rotation speed (=FCR rotation speed+predetermined value α) is equal to or smaller than the deceleration unnatural feeling rotation speed is satisfied. Accordingly, from time t5, the downshift of the variator 4 is started so that the engine speed at this time is gradually increased to the restriction minimum rotation speed. Then, when the engine speed reaches the restriction minimum rotation speed at time t6, the upshift of the variator 4 is started so that the engine speed is gradually decreased along the restriction minimum rotation speed characteristic calculated in accordance with the decrease of the FCR rotation speed.

Thereafter, the accelerator pedal return operation is started at time t7. When the state becomes the accelerator release state at time t8, the fuel cut control is started since the engine speed is increased by the minimum rotation speed restriction control to be equal to or greater than the FC allowable rotation speed of the fuel cut control. After time t8 of the fuel cut control start, the operation of the minimum rotation speed restriction control is maintained even in the accelerator release state. The engine rotation speed is maintained to the restriction minimum rotation speed (>the FCR rotation speed). Accordingly, the fuel cut control started at time t8 is continued until the next accelerator depression operation.

In the minimum rotation speed restriction control operation, the downshift of the variator 4 is started from time t5. The shift speed by the downshift is restricted so as not to provide the unnatural feeling to the occupant, as shown in characteristics of an arrow B in FIG. 8.

Moreover, the minimum rotation speed restriction control is started from time t5. The engine speed increased relative to a case where the minimum rotation speed restriction control is not performed. With this, the increase of the engine cooling water temperature is promoted as shown in characteristics of an arrow C in FIG. 8. By the promotion of the increase of the engine cooling water temperature, the FCR rotation speed calculated in accordance with the variation of the engine cooling water temperature is decreased from time t6 to time t8, so that the restriction minimum rotation speed is decreased in accordance with the decrease of the FCR rotation speed. Consequently, the shift control by the minimum rotation speed restriction control is shifted from the downshift of the variator 4 until time t6, to the upshift of the variator 4 from time t6.

[Characteristic Operation of Minimum Rotation Speed Restriction Control]

In the first embodiment, in the shift control of the CVT control unit 8, the minimum rotation speed restriction control is performed to control the transmission gear ratio of the variator 4 so that the rotation speed of the engine 1 becomes equal to or greater than the predetermined rotation speed, regardless of the vehicle front condition and the accelerator operation condition.

That is, the minimum rotation speed restriction control for intending the fuel cut control is performed regardless of the vehicle front condition and the accelerator operation condition. Accordingly, even in a traveling scene in which the release of the accelerator pedal is not presumed, the fuel cut control is surely started by the accelerator release operation by the satisfaction of the engine rotation speed condition. In this case, "a traveling scene in which the release of the accelerator pedal is not presumed" means that, for example, when the accelerator pedal is released for adjusting the vehicle speed for the traveling at the constant vehicle speed, the accelerator pedal is released by judging that the acceleration is not needed. Accordingly, it is possible to increase the frequency of the fuel cut control, relative to the conventional art disclosed in the Japanese Patent Application Publication No. 2011-185377.

Moreover, the minimum rotation speed restriction control for intending the fuel cut control is also performed during the accelerator release operation after the fuel cut control start. Accordingly, in a case where the fuel cut control is started, the control is not returned to the fuel cut recovery control by the dissatisfaction of the engine speed condition by the decrease of the engine speed. The fuel cut control is maintained until the next accelerator depression operation. Accordingly, the continuation time period of the fuel cut control is increased relative to a case where the minimum rotation speed restriction control is not performed during the accelerator release operation.

Consequently, even in the traveling scene in which the accelerator release operation is performed when there is no corner and no descending road ahead of the vehicle, or when the intervehicle distance is not decreased, it is possible to rapidly perform the fuel cut control by the accelerator release operation, and to improve the fuel economy. In this way, the minimum engine speed is increased by the shift control, regardless of the vehicle front condition and the accelerator depression condition. With this, it is possible to increase the frequency of the fuel cut control, and to increase the continuation time period of the fuel cut control. Therefore, when the accelerator pedal is released during the traveling, it is possible to enlarge the traveling scene in which the fuel cut control is performed for improving the fuel economy.

In the first embodiment, in the shift control of the CVT control unit 8, the target engine speed when the minimum rotation speed restriction control is performed is set to the restriction minimum rotation speed obtained by adding the predetermined value α to the predetermined rotation speed. The predetermined rotation speed is the FCR rotation speed used as the engine rotation speed condition of the fuel cut control. The predetermined value α is the addition value by which the restriction minimum rotation speed is not smaller than the engine speed condition (the FC allowable rotation speed, the FCR rotation speed) of the fuel cut control even when the engine speed Ne is varied due to the variation.

For example, the target engine speed when the minimum rotation speed restriction control is performed is set to the FC allowable rotation speed used as the entering condition of the fuel cut control. In this case, when the engine speed Ne is varied by the shift variation of the variator 4 and the variation of the rotation speed sensor, the entering condition of the fuel cut control is often not satisfied even when the accelerator release operation is performed. Moreover, the target engine speed when the minimum rotation speed restriction control is performed is set to the FCR rotation speed used as the exiting condition of the fuel cut control. In this case, when the engine speed Ne is varied by the shift variation of the variator 4 and the variation of the rotation speed sensor, the exiting condition of the fuel cut control is often satisfied during the fuel cut control.

Accordingly, the target engine speed when the minimum rotation speed restriction control is performed is set to the restriction minimum rotation speed obtained by adding the predetermined value α to the FCR rotation speed. Even when the engine speed Ne is varied due to the shift variation of the variator 4, the variation of the rotation speed sensor, and so on, the engine speed Ne does not become smaller than the FC allowable rotation speed and the FCR rotation speed which are used as the engine speed conditions of the fuel cut control, by the minimum rotation speed restriction control. Consequently, when the accelerator release operation is performed, it is possible to prevent the fuel cut control from being not started by the engine speed Ne decreased to be smaller than the FC allowable rotation speed. Moreover, during the fuel cut control, it is possible to prevent the fuel cut recovery by the engine speed Ne decreased to be smaller than the FCR rotation speed.

In the first embodiment, in the shift control of the CVT control unit 8, in a case where the engine speed Ne is smaller than the restriction minimum rotation speed when the minimum rotation speed restriction control is performed, the shift speed is restricted, and the variator 4 is downshifted.

That is, the minimum rotation speed restriction control is different from the normal shift control. The minimum rotation speed restriction control is a shift control for controlling the engine speed. The minimum rotation speed restriction control is performed regardless of no driver's shift intention. In a case where the minimum rotation speed restriction control is performed, it is necessary to downshift the variator when the engine speed is smaller than the restriction minimum rotation speed. However, in a case where the variator is downshifted without restricting the shift speed, the engine speed is rapidly increased to the restriction minimum rotation speed, so as to provide the unnatural feeling to the driver.

Contrary to this, in a case where the shift speed of the downshift of the variator 4 is restricted when the variator 4 is downshifted, the engine speed Ne is gradually increased to the restriction minimum rotation speed (the characteristic shown by the arrow B in FIG. 8). Besides, when the engine speed Ne reaches the restriction minimum rotation speed, the variator 4 is upshifted so that the engine speed Ne is decreased along the restriction minimum rotation speed. However, at the upshift, the FC allowable rotation speed and the FCR rotation speed are decreased by the gradual gradient by the increase of the engine cooling water temperature Te. With this, the engine speed Ne is gradually decreased along the restriction minimum rotation speed by the gradual gradient of the decrease (the characteristic shown by the arrow D in FIG. 8). Accordingly, it is possible to decrease the unnatural feeling to the driver at the shift of the variator 4 by the minimum rotation speed restriction control.

In the first embodiment, in the shift control of the CVT control unit 8, the deceleration unnatural feeling rotation speed is set by the engine speed by which the deceleration unnatural feeling is provided to the driver when the variator 4 is downshifted. When the restriction minimum rotation speed becomes equal to or smaller than the deceleration unnatural feeling rotation speed, the operation of the minimum rotation speed restriction control is allowed.

That is, the FC allowable rotation speed and the FCR rotation speed which are used in the fuel cut control is set to be higher as the engine cooling water temperature (or ATF oil temperature) is lower (FIG. 6). Accordingly, when the minimum rotation speed restriction control is performed in the first cold region and the second cold region, the engine speed after the downshift becomes extremely high. In a case where the accelerator pedal is released in this state, the excessive engine brake is generated. This excessive engine brake is excessive with respect to the intended deceleration of the driver.

Contrary to this, when the restriction minimum rotation speed is equal to or smaller than the deceleration unnatural feeling rotation speed, that is, only when the engine speed after the downshift is the engine speed by which the excessive engine brake is not generated, the operation of the minimum rotation speed restriction control is allowed. Accordingly, while the restriction minimum rotation speed is greater than the deceleration unnatural feeling rotation speed, the operation of the minimum rotation speed restriction control is not allowed. With this, it is possible to prevent the generation of the excessive engine brake at the release of the accelerator pedal.

In the first embodiment, in the shift control of the CVT control unit 8, the torque converter 2 including the lockup clutch 20 is disposed between the engine 1 and the variator 4. When the lockup clutch 20 is in the power transmitting state, the operation of the minimum rotation speed restriction control is allowed. In this case, "when the lockup clutch 20 is in the power transmitting state" means the slippage engagement state, and the full engagement state having no rotation speed difference.

That is, in the disengagement state of the lockup clutch, when the minimum rotation speed restriction control is performed by the shift of the variator, the input rotation speed of the variator is increased. However, the increase of the engine speed is suppressed by the fluid slippage in the torque converter. Accordingly, even when the accelerator release operation is performed, the engine speed is not increased to the FC allowable rotation speed of the fuel cut control. The fuel cut control is not started, so that it is not possible to improve the fuel economy.

Contrary to this, in the power transmitting state of the lockup clutch 20, when the operation of the minimum rotation speed restriction control is allowed, the primary rotation speed is increased by the downshift of the variator 4. The engine speed is increased in accordance with the increase of the primary rotation speed. Accordingly, in the power transmitting state of the lockup clutch 20, it is possible to increase the engine speed by the shift control of the variator 4. Besides, a best mode is the full engagement state of the lockup clutch 20. In the full engagement state, the increase of the primary rotation speed and the increase of the engine speed correspond to each other. However, even when the lockup clutch 20 is in the slip engagement state, the engine speed is increased by the following characteristic in which it is delayed by the slip amount with respect to the increase of the primary rotation speed.

In the first embodiment, in the shift control in the CVT control unit 8, the warm-up transition region (Te1<Te≤Te2) before the engine cooling water temperature Te enters the engine warm-up region is the operation region of the minimum rotation speed restriction control.

That is, the warm-up transition region (Te1<Te≤Te2) before the engine cooling water temperature Te enters the engine warm-up region is a region in which the fuel cut control is not performed, or a region in which the fuel cut recovery is performed after a short time period even when the fuel cut control is started.

Contrary to this, the warm-up transition region (Te1<Te≤Te2) before the engine cooling water temperature Te enters the engine warm-up region is set to the operation region of the minimum rotation speed restriction control. With this, in the warm-up transition region, the engine speed condition of the fuel cut control is satisfied by the increase of the engine speed. In addition, the temperature increase of the engine cooling water and the ATF oil temperature is promoted by the increase of the engine speed. Accordingly, the warm-up transition region is set to the operation region of the minimum rotation speed restriction control. With this, by setting the warm-up transition region to the operation region of the minimum rotation speed restriction control, it is possible to set the warm-up transition region to the enlarged region of the fuel cut control, and to promote the temperature increase of the engine cooling water and the ATF oil temperature. Besides, when the temperature increase of the engine cooling water is promoted, it is possible to enter, at an early timing, the warm-up region in which the fuel cut control is performed by the normal shift control. Moreover, when the temperature increase of the ATF oil temperature is promoted, it is possible to stabilize the hydraulic pressure response of the shift control at an early timing.

Next, effects are explained.

In the shift control device for the vehicle according to the first embodiment, it is possible to obtain the following effects.

(1) A shift control device for a vehicle includes:

an engine 1;

a shift mechanism (variator 4) disposed between an engine and driving wheels 6;

a shift control means (CVT control unit 8) configured to control a transmission gear ratio of the shift mechanism (variator 4); and a fuel cut control means (engine control unit 88) configured to stop a fuel supply to the engine 1, at least when an accelerator pedal is in a release state, and when an engine speed of the engine 1 is equal to or greater than a predetermined rotation speed, The shift control means (the CVT control unit 8, FIG. 5) is configured to perform a minimum rotation speed restriction control to control the transmission gear ratio of the shift mechanism (variator 4) so that the rotation speed of the engine is equal to or greater than the predetermined rotation speed regardless of a vehicle front condition and an accelerator operation condition.

Accordingly, it is possible to enlarge the traveling scene in which the fuel cut control for improving the fuel economy is performed.

(2) The shift control means (CVT control unit, FIG. 5) is configured to set a target engine speed when the minimum rotation speed restriction control is performed, to a restriction minimum rotation speed obtained by adding a predetermined value α to the predetermined rotation speed, The shift control means (CVT control unit, FIG. 5) is configured to set the predetermined rotation speed to a rotation speed (FC allowable rotation speed, or FCR rotation speed) which is used as an engine speed condition of the fuel cut control, and which is determined in accordance with an engine cooling water temperature, and The shift control means (CVT control unit, FIG. 5) is configured to set the predetermined value α to an additional value by which the restriction minimum rotation speed is not decreased to be smaller than the engine rotation speed condition of the fuel cut control even when the engine speed Ne is varied due to a variation.

Accordingly, in addition to the effect (1), it is possible to prevent the fuel cut control from being not started by the engine speed Ne being decreased to be smaller than the FC allowable rotation speed when the accelerator release operation is performed. Moreover, during the fuel cut control, it is possible to prevent the fuel cut recovery by the engine rotation speed Ne being decreased to be smaller than the FCR rotation speed.

(3) The shift mechanism is a continuously variable transmission mechanism (variator 4) in which the transmission gear ratio is continuously varied; and the shift control means (CVT control unit, FIG. 5) is configured to downshift the continuously variable transmission mechanism by restricting a shift speed in a case where the engine speed Ne is smaller than the restriction minimum rotation speed when the minimum rotation speed restriction control is performed.

Accordingly, in addition to the effect (2), it is possible to decrease the shift unnatural feeling provided to the driver at the shift of the variator 4 by the minimum rotation speed restriction control.

(4) The shift control means (CVT control unit, FIG. 5) is configured to set a deceleration unnatural feeling rotation speed to an engine speed by which a deceleration unnatural feeling is provided to a driver at the downshift of the shift mechanism (variator 4).

The shift control means (CVT control unit, FIG. 5) is configured to allow the operation of the minimum rotation speed restriction control when the restriction minimum rotation speed is equal to or smaller than the deceleration unnatural feeling rotation speed.

Accordingly, in addition to the effect (2) or (3), it is possible to prevent the generation of the excessive engine brake at the accelerator pedal release since the operation of the minimum rotation speed restriction control is not allowed while the restriction minimum rotation speed exceeds the deceleration unnatural feeling rotation speed.

(5) A torque converter 2 including a lockup clutch 20 is disposed between the engine 1 and the shift mechanism (variator 4).

The shift control means (CVT control unit 8, FIG. 5) is configured to allow the operation of the minimum rotation speed restriction control when the lockup clutch 20 is in a power transmitting state.

Accordingly, in addition to the effects (1) to (4), it is possible to rapidly increase the engine speed by the shift control of the shift mechanism (the variator 4) when the lockup clutch 20 is in the power transmitting state.

(6) The shift control means (CVT control unit 8, FIG. 5) is configured to set a warm-up transition region (Te1<Te≤Te2) before the engine cooling water temperature Te enters an engine warm-up region, to an operation region of the minimum rotation speed restriction control.

Accordingly, in addition to the effects (1) to (5), it is possible to set the warm-up transition region to the enlarged region of the fuel cut control, and to promote the temperature increase of the engine cooling water and the ATF oil temperature.

Hereinabove, the shift control device for the vehicle according to the present invention is explained based on the first embodiment. However, the concrete configuration is not limited to this first embodiment. Variations, additions, and so on of design are allowable as long as it is not deviated from the gist of the present invention claimed in claims.

In the first embodiment, the shift mechanism is the variator 4 (the continuously variable transmission mechanism) arranged to continuously vary the transmission gear ratio. However, the shift mechanism may be a stepwise variable transmission mechanism (for example, an automatic transmission referred to as a step AT) arranged to stepwisely vary the transmission gear ratio. The shift mechanism may be a shift mechanism (for example, a belt type continuously variable transmission with an auxiliary transmission) by a combination of the stepwise variable transmission mechanism and the continuously variable transmission mechanism.

In the first embodiment, the target engine speed when the minimum rotation speed restriction control is performed is the restriction minimum rotation speed obtained by adding the predetermined value α to the FCR rotation speed. However, the target engine speed when the minimum rotation speed restriction control is performed is the restriction minimum rotation speed obtained by adding the predetermined value β (<the predetermined value α) to the FC allowable rotation speed.

In the first embodiment, the allowance of the operation of the minimum rotation speed restriction control is judged when the restriction minimum rotation speed becomes equal to or smaller than the deceleration unnatural feeling rotation speed. However, the allowance of the operation of the minimum rotation speed restriction control may be judged when the engine cooling water temperature becomes equal to or greater than a predetermined water temperature, or when the ATF oil temperature becomes equal to or greater than a predetermined oil temperature.

In the first embodiment, the allowance of the operation of the minimum rotation speed restriction control is judged when the lockup clutch 20 is in the full engagement state. However, the allowance of the operation of the minimum rotation speed restriction control is judged when the lockup clutch is in the engagement state including the slip engagement state.

In the first embodiment, the shift control device according to the present invention is applied to the engine vehicle including the engine configured to perform the fuel cut control to stop the fuel supply to the engine in accordance with the accelerator operation condition and the engine speed condition. However, the shift control device according to the present invention is not limited to the engine vehicle. The shift control device according to the present invention is applicable to a hybrid vehicle including an engine and a motor which are driving sources for traveling as long as a vehicle includes an engine arranged to perform the fuel cut control.

The invention claimed is:

1. A shift control device for a vehicle comprising:
an engine;
a shift mechanism disposed between the engine and driving wheels;
a shift control section configured to control a transmission gear ratio of the shift mechanism; and
a fuel cut control section configured to stop a fuel supply to the engine, at least when an accelerator pedal is in a release state, and when an engine speed is equal to or greater than a predetermined rotation speed,
the shift control section being configured to perform a minimum rotation speed restriction control to control the transmission gear ratio of the shift mechanism so that the minimum rotation speed of the engine is equal to or greater than the predetermined rotation speed,
wherein the shift control section is configured to set a target engine speed when the minimum rotation speed restriction control is performed, to a restriction minimum rotation speed obtained by adding a predetermined value to the predetermined rotation speed, and
wherein the shift control section is configured to set a deceleration unnatural feeling rotation speed to an engine speed by which a deceleration unnatural feeling is provided to a driver at the downshift of the shift mechanism, and to allow the operation of the minimum rotation speed restriction control when the restriction minimum rotation speed is equal to or smaller than the deceleration unnatural feeling rotation speed.

2. The shift control device for the vehicle as claimed in claim 1, wherein the shift control section is configured to:
set the predetermined rotation speed to a rotation speed which is used as an engine speed condition of the fuel cut control, and which is determined in accordance with an engine cooling water temperature, and
set the predetermined value to an additional value by which the restriction minimum rotation speed is not decreased to be smaller than the engine rotation speed condition of the fuel cut control even when the engine speed is varied due to a variation.

3. The shift control device for the vehicle as claimed in claim 2, wherein the shift mechanism is a continuously variable transmission mechanism in which the transmission gear ratio is continuously varied; and the shift control section is configured to downshift the continuously variable transmission mechanism by restricting a shift speed in a case where the engine speed is smaller than the restriction minimum rotation speed when the minimum rotation speed restriction control is performed.

4. The shift control device for the vehicle as claimed in claim 1, wherein a torque converter including a lockup clutch is disposed between the engine and the shift mechanism; and the shift control section is configured to allow the operation of the minimum rotation speed restriction control when the lockup clutch is in a power transmitting state.

5. The shift control device for the vehicle as claimed in claim 1, wherein the shift control section is configured to perform the minimum rotation speed restriction control when the engine cooling water temperature is in a warm-up transition region before entering an engine warm-up region.

6. A shift control method for a vehicle in a shift control mechanism including an engine, a shift mechanism disposed between the engine and driving wheels, a shift control section configured to control a transmission gear ratio of the shift mechanism; and a fuel cut control section configured to stop a fuel supply to the engine, at least when an accelerator pedal is in a release state, and when an engine speed is equal to or greater than a predetermined rotation speed, the shift control method to shift control the shift mechanism, the shift control method comprising:
performing, via the shift control section, a minimum rotation speed restriction control to control the transmission gear ratio of the shift mechanism so that the minimum rotation speed of the engine is equal to or greater than the predetermined rotation speed,
setting, via the shift control section, a target engine speed when the minimum rotation speed restriction control is performed, to a restriction minimum rotation speed obtained by adding a predetermined value to the predetermined rotation speed, and
setting, via the shift control section, a deceleration unnatural feeling rotation speed to an engine speed by which a deceleration unnatural feeling is provided to a driver at the downshift of the shift mechanism, and allowing the operation of the minimum rotation speed restriction control when the restriction minimum rotation speed is equal to or smaller than the deceleration unnatural feeling rotation speed.

* * * * *